Jan. 17, 1939.  A. D. SHELDON  2,144,580
HITCH
Filed March 8, 1938  2 Sheets—Sheet 1

Inventor
Allen D. Sheldon.

By Clarence A. O'Brien
and Hyman Berman
Attorneys

Jan. 17, 1939.   A. D. SHELDON   2,144,580
HITCH
Filed March 8, 1938   2 Sheets-Sheet 2
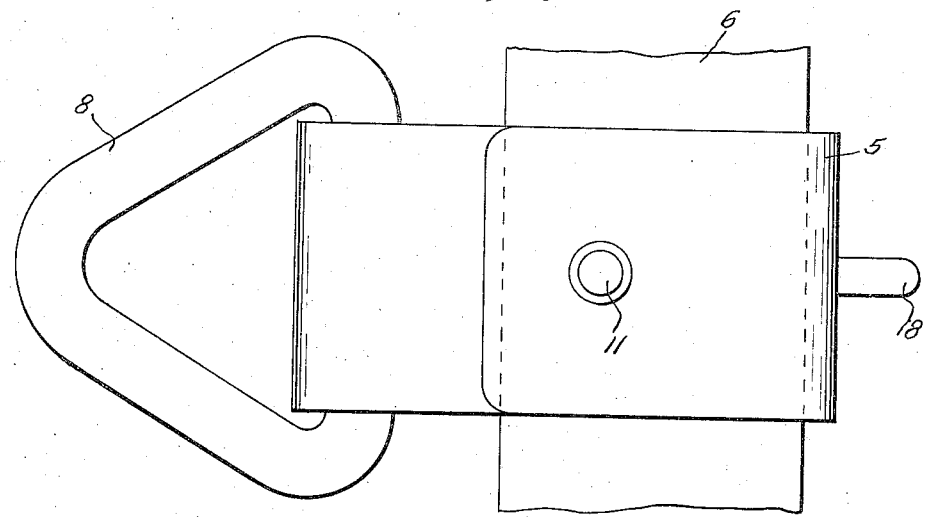
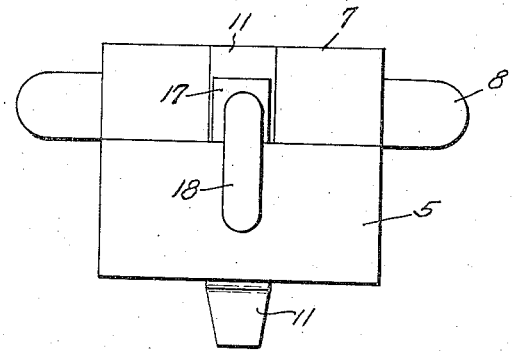
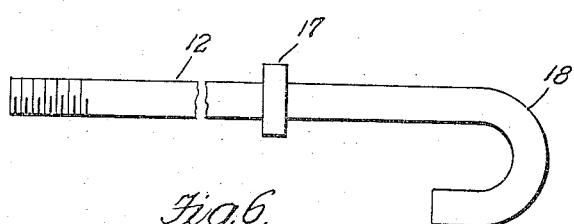
Inventor
Allen D. Sheldon,
By Clarence A. O'Brien
and Hyman Berman
Attorneys Patented Jan. 17, 1939

2,144,580

UNITED STATES PATENT OFFICE 2,144,580

HITCH

Allen D. Sheldon, Lexington, Nebr.

Application March 8, 1938, Serial No. 194,669

5 Claims. (Cl. 280—33.15)

This invention relates to a hitch and an object of the invention is to provide a hitch which will dispense with clevises as now resorted to for coupling vehicles and the like together, and at the same time to provide a hitch which will be a material improvement over the hitches now generally used and which will be characterized by strength, durability in its structure, and safety in its operation.

The invention together with its objects and advantages will be best understood from a study of the following description taken in connection with the accompanying drawings wherein:—

Figure 4 is a bottom plan view of the hitch,

Figure 5 is an end elevational view of the hitch, and

Figure 6 is a side elevational view of a key forming part of the hitch assembly.

Referring more in detail to the drawings it will be seen that my improved hitch comprises a substantially U-shaped member 5 adapted to straddle the pull-bar or the like 6 of a tractor or other draft vehicle.

Figure 1:
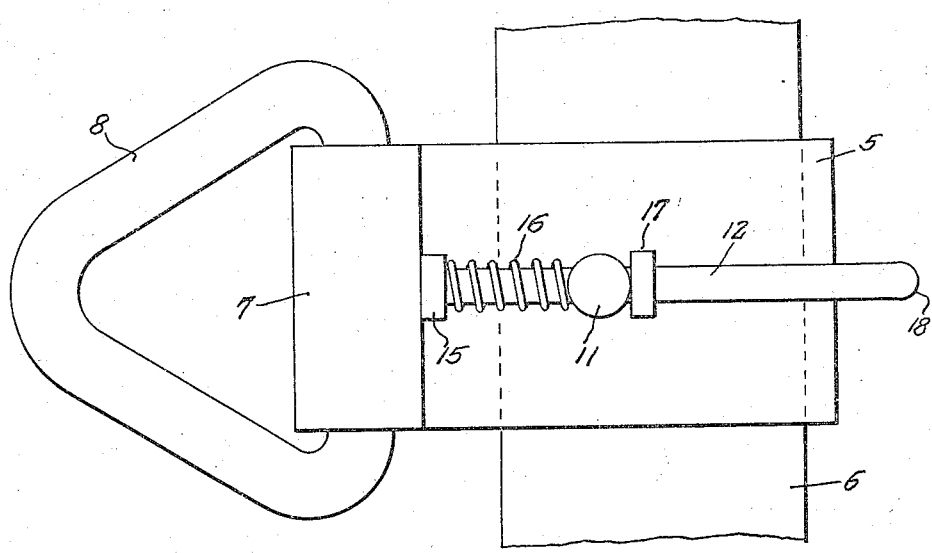
Figure 1 is a top plan view of the hitch.
Figure 2:
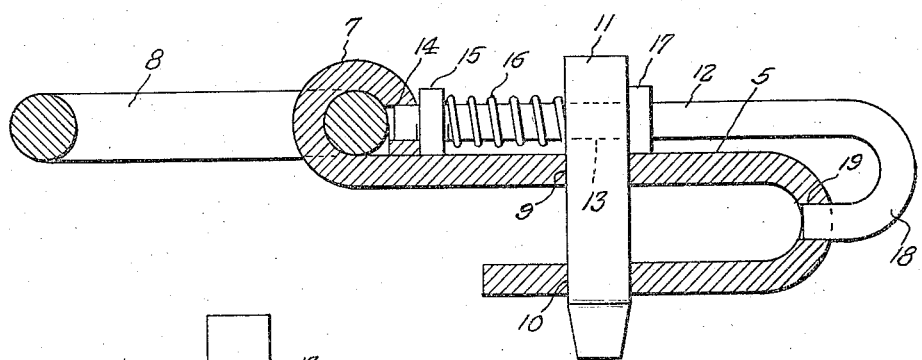
Figure 2 is a longitudinal sectional view therethrough with certain parts shown in elevation.
Figure 3:
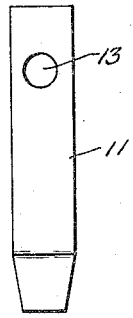
Figure 3 is an elevational view of a pin forming part of the hitch.

The top arm of the member 5 is slightly longer than the bottom arm of said member as shown in Figure 2 and said top arm at its free end is rolled back upon itself to provide a sleeve 7 that extends transversely of the member 5 and serves as a hinge sleeve for hingedly connecting to the member 5 a hitch link 8 which may be of any suitable shape but which is shown in the present instance as being substantially triangular in plan.

Also the arms of the member 5 are provided with aligning openings 9 and 10 to align with the usual opening provided in the bar 6 of the draft vehicle whereby to accommodate a coupling pin 11 that serves to retain the member 5 in proper association with the bar 6.

For the pin 11 there is provided a locking key 12 that has a sliding fit in a transverse opening 13 in the pin 11 and has a threaded end that is normally accommodated within an opening 14 provided therefor in one side of the sleeve 7 as shown in Figure 2.

On the threaded end of the key 12 is an adjustment nut 15 between which and the pin 11 there is interposed a coil spring 16.

Also on the key 12 is a fixed collar 17 that under action of spring 16 is drawn into abutting engagement with the pin 11 at the side thereof opposite to the spring 16.

The key 12 is also provided at the end thereof remote from the nut 15 with an integral hook 18 the free end of which is normally engaged with an opening 19 provided in the bight or closed end of the U-shaped member 5 through the medium of the spring 16.

Obviously to detach the member 5 from the bar 6 of the draft vehicle key 12, moved rearwardly against the action of spring 16, so as to remove the ends of the key 12 from the holes 14 and 19. Pin 11 may then be withdrawn vertically through the openings 9 and 10 in the member 5 and the opening in the bar 6 thus permitting member 5 to be completely removed from the bar 6. If it is desired to remove the key from the pin 11 then nut 15 is removed from the key so that the spring 16 can be removed and then the key can be pulled through the hole in the pin 11.

In using the device the hitch link 8 is engaged in the usual manner with any suitable draft device provided on the forward end on the trailing or towed vehicle.

From the foregoing it will be seen that I have provided a hitch for use on tractors or the like for drawing vehicles such as farm machinery and analogous wheeled vehicles and which hitch can be quickly and easily mounted on and properly secured in associated with the pull-bar of such draft vehicle as a tractor or the like.

It is thought that a clear understanding of the construction, utility and advantages of an invention of this character will be had without a more detailed description.

Having thus described the invention what is claimed as new is:—

1. A trailer hitch comprising a substantially U-shaped member adapted to straddle a portion of a vehicle and extend transversely thereof, said U-shaped member having the legs thereof provided with aligned openings adapted to align with an opening in said portion of the vehicle, a hitch pin engaging in the openings and provided adjacent its upper end with a transverse opening, a key extending through the transverse opening in said pin, and having its rear end bent downwardly into hook-shape, the bight of the U-shaped member having a hole therein to receive the end of the hook-shaped part of the key, a spring on the key having one end bearing against the pin, and a projection on the front end of the key engaging the upper end of the spring and a hitch link hinged to one leg of said U-shaped member at the open end of the U.

2. A trailer hitch comprising a substantially U-shaped member adapted to straddle a portion of a vehicle and extend transversely thereof, said U-shaped member having the legs thereof provided with aligned openings adapted to align with an opening in said portion of the vehicle, said U-shaped member having a hole in its bight part, a hitch pin engaging in the openings and provided adjacent its upper end with a transverse opening, a key extending through the transverse opening in said pin, and a hitch link hinged to one leg of said U-shaped member at the open end of the U, said key having a shoulder thereon intermediate its ends to abut one side of said pin, the rear end of the key being of hook-shape, an adjustable spring device on one end of said key and having the spring thereof bearing on said pin at the side thereof opposite to said shoulder, said spring device acting to hold the end of the hook-shaped part in the hole of the bight of the U-shaped member.

3. A trailer hitch comprising a substantially U-shaped member adapted to straddle a portion of a vehicle and extend transversely thereof, said U-shaped member having the legs thereof provided with aligned openings adapted to align with an opening in said portion of the vehicle, a hitch pin engaging in the openings and provided adjacent its upper end with a transverse opening, a key extending through the transverse opening in said pin, and a hitch link hinged to one leg of said U-shaped member at the open end of the U, said key having a shoulder thereon intermediate its ends to abut one side of said pin, an adjustable spring device on one end of said key and having the spring thereof bearing on said pin at the side thereof opposite to said shoulder, said key at the opposite end thereof being formed with an integral hook and said U-shaped member at the closed end of the U being provided with an opening receiving the free end of the bill of said hook.

4. A trailer hitch comprising a U-shaped member adapted to straddle a portion of a vehicle and extend transversely thereof, said U-shaped member having openings in the legs thereof adapted to register with an opening in said portion of the vehicle, a retaining pin extending through the openings in the legs of said U-shaped member and an opening in the portion of the vehicle, said U-shaped member having one of said legs at the open end of the U provided with a hinge sleeve, a hitch link having a portion thereof engaged in said sleeve, said sleeve at one side thereof being provided with an opening, and said pin at the upper end thereof being provided with a transverse opening, a key extending through the transverse opening in said pin and having an end adapted to engage in the opening in said sleeve, a spring device on said key and having an end bearing against said pin for normally urging the first-named end of said key into the opening in said sleeve, and said key being also provided with a shoulder adapted to abut said pin at the side thereof opposite to said spring device.

5. A hitch of the class described comprising a substantially U-shaped member adapted to straddle a portion of a vehicle and having a hole in its bight part, an upstanding portion at the front end of one limb of the U-shaped member having a hole in its rear portion, the limbs of said U-shaped member having aligned holes therein, the pin passing through the aligned holes and through that portion of the vehicle straddled by the U-shaped member, the upper end of the pin having a hole therein, a key passing through the hole in the pin and having the hook-shaped end for engaging the hole in the bight of the U-shaped member with its front end engaging the hole in the upstanding part, a nut on the front end of the key, a spring located between the nut and the pin and surrounding a portion of the key.

ALLEN D. SHELDON.